FIG. I

INVENTOR
CALVIN HULSTEIN

INVENTOR
CALVIN HULSTEIN
BY Michael J. Murphy
ATTORNEY

United States Patent Office 3,676,039
Patented July 11, 1972

3,676,039
VARIABLE ORIFICE EXTRUSION HEAD
Calvin Hulstein, Wapping, Conn., assignor to
Monsanto Company, St. Louis, Mo.
Filed Aug. 5, 1970, Ser. No. 61,381
Int. Cl. B29d 23/04
U.S. Cl. 425—466          6 Claims

ABSTRACT OF THE DISCLOSURE

A variable orifice extrusion head for extruding thermoplastic tubular products of varying wall thicknesses. The head has a spider member within the outer body which includes a conically shaped nose portion positioned in the flow passage for dispersing the thermoplastic outwardly. A relatively short mandrel slidably mounted within the spider member below the nose portion has a tip which cooperates with the outlet in the body to define the extrusion orifice. Means operable in a direction parallel to the mandrel are provided for axially moving the mandrel to provide variable orifice capability.

---

This invention relates to an extrusion head and more particularly to a variable orifice extrusion head for forming tubular parisons of heat sensitive thermoplastic materials.

With conventional extrusion equipment for forming thermoplastic tubular parisons, a solid rod of the heat softened plastic is generally forced into an extrusion head having a vertically extending bore at 90 degrees to the inlet and in which a concentrically mounted mandrel is situated, the space between the mandrel and the wall of the bore defining the flow passage for the material. The solid rod of material on entering such an extrusion head impinges against the vertically extending mandrel and consequently splits into two streams in assuming the shape of the annular space. Desirably, the two streams on meeting on the opposite side of the mandrel from that initially exposed to the material will fuse together forming a homogeneous tube conforming to the annular space without any surface defects. However, for difficulty processable materials which are stiff in flow and/or sensitive to high temperatures, this flow splitting causes a problem to the extent that the material knits or fuses together in a non-uniform manner in the annular space adjoining the far side of the mandrel, possibly as a result of a slight drop in the temperature of the material in flowing around the mandrel. Thus, undesirable weld lines occur in the material which appear in the article blown from the parison, and which correspond to the portion of the thermoplastic which fused imperfectly on the far side of the mandrel in the extrusion head.

To overcome this weld line problem, there has been developed in the prior art a spider type structure for incorporation into the extrusion head. With this type of internal arrangement, the entire material flow in the form of a solid rod is directed downwardly over a shortened mandrel held in position in the head by means of horizontal arms cooperating with outer supporting structure. This approach has generally solved the weld line problem since flow splitting into two distinct streams is eliminated.

However, utilization of such structure has not been without a sacrifice in the ability to carry out another highly desirable processing feature. Article shapes moldable from extruded tubular parisons in recent years are progressively becoming more complex in the sense of having one or more sections which vary substantially from a circular cross section. Thus, when a cylindrically tubular parison is expanded within a blow mold corresponding to such a shape, some portions of the parison are stretched more than others in reaching the mold walls and consequently are thinner in wall thickness. Such thinned areas of reduced wall thickness represent weak sections in the finished article. Also, when the article is a narrow necked bottle, the neck inherently (and generally unnecessarily) will be thicker than the body of the bottle due to the differences in diameter, assuming the bottle is blown from a parison of constant wall thickness. To offset this shortcoming, the technique has been developed of selectively varying the size of the outlet orifice of the extrusion head and consequently the wall thickness of the extruding parison, as generally set forth in U.S. Pat. No. 3,420,926, assigned to the assignee of the present invention. This permits matching the wall thickness of the parison with the finished configuration of the blown article and is highly desirable since it provides improved uniformity of wall thickness in the blown object. However, the mandrel which defines the inner surface of the extrusion outlet is axially moved in the prior art by means operating on the upper end of the mandrel or an extension thereof which protrudes from the extrusion head. Since the mandrel cannot projct from a head utilizing spider structure, it has not been possible in the prior art to utilize means for axially moving the mandrel which operate parallel to the axis of the head. Consequently, known methods for varying the size of the outlet orifice in a spider type extrusion head have involved either stopping the extrusion and manually and laboriously changing the size and/or shape of the mandrel tip, or reciprocating a portion of the body of the head which contains the opening defining the outer surface of the extrusion orifice, with respect to a fixed inner mandrel which defines the inner surface of the orifice. Manual changing is obviously laborious and time consuming. Reciprocating a portion of the head requires the presence of an outer, stationary member along which the reciprocating portion slides. Since this is the area in which the interior of the head is sealed from the exterior, the tolerances on these surfaces must be extremely narrow, and it has been found that after extended periods of use, wear and consequent leakage of the melt between such mating surfaces occurs. Other prior art systems for varying the size of the extrusion orifice must be specially designed to operate via plural pin linkages at 90 degrees to the direction of flow, since the melt is fed to the extrusion head via a vertical extruder.

SUMMARY OF THE INVENTION

Now, however, there has been discovered a unique structure which overcomes the above mentioned problems of the prior art in a simple and relatively straightforward manner.

Accordingly, it is an object of this invention to provide an improved extrusion head for the thermoplastics which are relatively stiff in flow and sensitive to heat with variable outlet orifice capability.

Another object of this invention is to provide an extrusion head utilizing an internal spider member to obtain improved uniformity of flow of thermoplastic therethrough, which has a variable size outlet orifice to permit varying the wall thickness of a tubular parison issuing from the orifice according to a preselected program without interrupting extrusion.

A further object of this invention is to provide improved inner parison surface defining structure in an extrusion head to the extent that a portion of the structure is stationary and configured to initiate even formation of the parison while a downstream portion is movable to permit varying the size of the extrusion orifice and consequently the parison wall thickness.

An additional object of this invention is to provide an extrusion head which incorporates a spider type support for the tip member defining the inner surface of the outlet orifice yet allows the tip to be moved by means operating parallel to the axis of the tip so that the advantages of programming the orifice size are attainable via conventional means for accomplishing the latter.

Other objects of this invention will in part be obvious and will in part appear hereinafter.

These and other objects are accomplished in an extrusion head for producing a thermoplastic parison of varying wall thicknesses by providing the combination comprising outer body means having a flow passage formed therein for the thermoplastic, inner body means disposed within the outer body means comprising a spider member having a generally conically shaped nose portion concentrically positioned within the passage for dispersing the thermoplastic outwardly as it comes into contact therewith, a mandrel mounted in the spider member having a tip portion which cooperates with the outer body means to define an annular orifice for forming the thermoplastic parison and means operable in a direction parallel to the mandrel for axially moving the mandrel to vary the size of the orifice and consequently the thickness of the parison being formed therein.

The spider member preferably has a hollow cylindrical portion extending downwardly from the base of the conically shaped nose portion, a ring member concentric with and spaced outwardly from the cylindrical portion, the space therebetween defining a section of flow passage for the plastic and a plurality of angularly spaced spider arms extending across the space, the ends of the arms being rigidly connected respectively to the cylindrical portion and the ring member. The mandrel preferably is slidably mounted in the hollow cylindrical portion of the spider member to provide the variable outlet orifice capability. The means for axially moving the mandrel preferably includes an actuating sleeve mounted for axial movement on the outer surface of the spider member, a dowel pin fastening the sleeve and mandrel together, a plurality of vertically extending bores in the outer body means, a positioning collar at the upper end of the outer body means, a plurality of rods in the bores fastening the collar to the sleeve, and means associated with the collar for imparting axial movement thereto.

BRIEF DESCRIPTION OF THE DRAWINGS

In describing the overall invention, reference will be made to the accompanying drawings wherein.

DETAILED DESCRIPTION OF THE INVENTION

Figure 1:
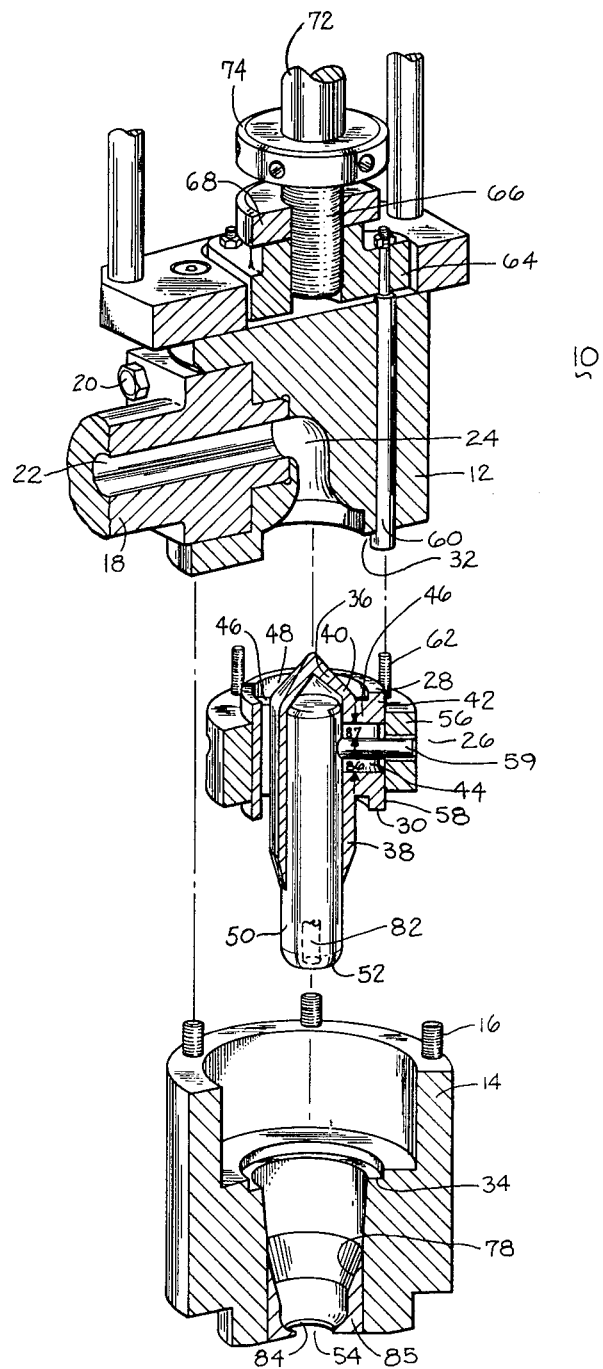
FIG. 1 is a partially sectioned, perspective view with parts separated of the basic portion of an extrusion head embodiment of the present invention.

Referring now to the drawings, there is illustrated in FIG. 1 an extrusion head with components separated, generally indicated as 10, for producing a thermoplastic parison of varying wall thicknesses. It should be noted that, though head 10 has specific application in the processing of heat sensitive materials, it is likewise suitable for forming parisons of any thermoplastic material.

Figure 2:
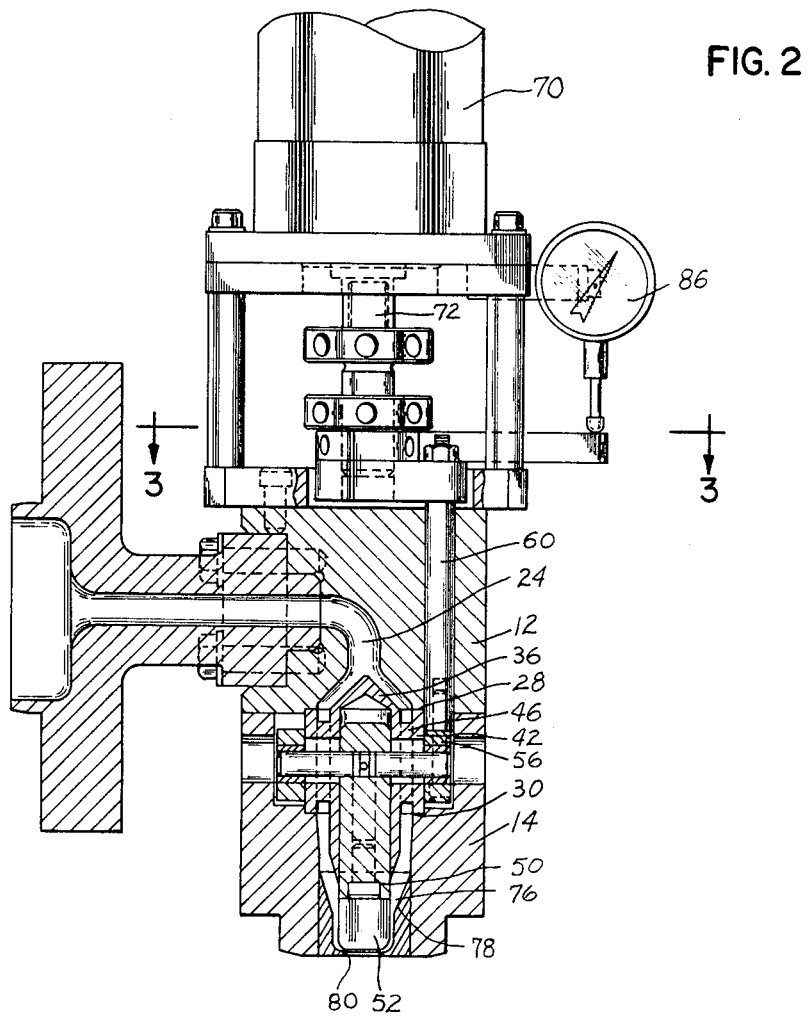
FIG. 2 is a vertical sectional view of the extrusion head of FIG. 1 in assembled form.
Figure 3:
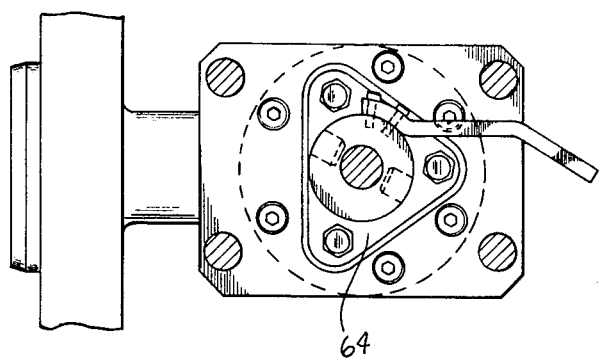
FIG. 3 is a sectional view taken along the line 3—3 of FIG. 2.

Extrusion head 10 comprises outer body means which includes a housing having an upper portion 12 and a lower portion 14 releasably secured by any suitable means such as cap screws 16 to upper portion 12. The outer body means further comprises an inlet member 18 secured by means of bolts 20 to upper portion 12. Inlet member 18 has a conventional flange (FIG. 3) which may be bolted to the outlet of a conventional horizontally mounted extruder such that flow of the heat plastified thermoplastic enters head 10 through horizontally extending passage 22 of entrance member 18. Upper portion 12 has a flow passage 24 therein in the shape of a downwardly directed gooseneck, the horizontal portion thereof being aligned opposite the downstream end of passage 22 in member 18 with the vertical portion extending at 90 degrees to the horizontal portion and interconnected with the latter by a relatively gently changing 90 degree transition piece, as depicted in FIGS. 1 and 2.

Extrusion head 10 further includes inner body means or spired member 26 disposed within the outer body means. When extrusion head 10 is in assembled form, spider member 26 is rigidly clamped between upper housing portion 12 and lower housing portion 14 as generally depicted in FIG. 2, with sealing occurring between faces 28 and 30 of spider member 26 and opposing surfaces 32 and 34 in upper and lower housing portions 12 and 14 respectively. Spider member 26 has a conical nose portion 36 which when in the assembled position of FIG. 2 has its upper extremity located at the lower end of the vertical portion of gooseneck shaped passage 24. The conical wall of nose 28 is situated in an expanded portion of the flow passage of the upper housing portion 12 (FIG. 2). Spider member 26 further includes a hollow cylindrical portion 38 downwardly extending from the base 40 of conical portion 36. A ring member 42 is spaced outwardly from and concentric with cylindrical portion 38 and conical or nose portion 36. Ring member 42 has a pair (only 1 shown in FIG. 1) of vertically oriented, oppositely disposed slots 44 formed therein. A plurality of arms 46 span the space 48 between and rigidly secure cylindrical portion 38 and ring member 42 together. The upper portions of these arms may decrease smoothly in cross section (not shown) in order to decrease frictional resistance to flow of material. Space 48 constitutes an extension in the vertical direction of the flow passage for the plastic material through the head. Oppositely disposed vertically oriented slots (only 1 shown in FIG. 1) extend through ring member 42, arm 46 and cylindrical portion 38.

A mandrel 50 is vertically slidably mounted within cylindrical portion 38 as illustrated in FIG. 1 and has a lower section which extends beyond the lower end of cylindrical portion 38 of spider member 26. This lower section has tip portion 52 which cooperates with opening 54 (FIG. 1) in lower housing portion 14 to define an annular outlet orifice 80 (FIG. 2) for forming a thermoplastic parison therein.

Extrusion head 10 further includes means operable in a vertical direction for axially moving mandrel 50 to vary the size of the extrusion outlet orifice and consequently the wall thickness of the parison being formed therein. These means include an actuating sleeve 56 mounted for axial movement along the outer surface 58 of ring member 42. Dowel pin 59 extends thru slots 44 in ring member 42, spider arms 46, cylindrical portion 38 as well as thru a horizontal bore in mandrel 50. As illustrated, pin 59 is rigidly fastened at each end to sleeve 56. Upper housing portion 12 has a plurality of vertically extending bores formed therein, which in the illustrated embodiment are three in number. A rod 60 is positioned in each of these bores and is threadably fastened at its lower end by means of a fastening member 62 to sleeve 56 and at its upper end to vertically movable collar 64 as illustrated in FIG. 1. Shaft 66 is threadably secured in collar 64 by means of locknut 68. Means such as a fluid actuable cylinder 70 are connected to end 72 of shaft 66, for imparting axial movement to shaft 66. Alternatively, cylinder 70 and its interior piston (not shown) could serve as a means for insuring that a conventional follower (not shown) mounted on the upper end of the piston shaft is always in true peripheral contact with conventional programming means such as a cam, in the sense that it is permanently biased upwardly and must be overcome by a force generated by the revolving cam in order to move axially downward. Member 74 is threadably secured on shaft 66 above member 68 and serves to limit the extent of upward movement of shaft 66.

In operation, heat plastified thermoplastic enters gooseneck 24 through horizontal passage 22 and is evenly dispersed outwardly on contacting conical nose portion 36 so as to flow downwardly through space 48 between ring member 42 and cylindrical portion 38 of spider member 26 as a result of the pressure generated in the extruder to which head 10 is secured. The material thus eventually assumes the dimensions of the annular space 76 between the outer surface of tip portion 52 of mandrel 50 and the inner surface 78 of the lower portion 14 of the housing as its flows toward extrusion outlet orifice 80. The flow passage for the material as it passes through head 10 including the spider member 26 and lower housing member 14 is streamlined in cross section and is free of any corners or projections which might provide areas for heat sensitive thermoplastic being processed to build up and eventually degrade.

As the thermoplastic in the form of a tubular parison issues from extrusion outlet 80, after closing off a leading end portion thereof, it may optionally be preinflated, as desired, by means of pressurized fluid admitted to its interior through a bore, for example 82 (FIG. 1) conventionally connected, for example through pin 59 and one of members 60 to a source of pressurized fluid. Such preinflation aids at least partially in distending the parison so as to approach the final article configuration prior to enclosure within a downstream blow mold (not shown).

When it is desired to vary the size of outlet orifice 80 by changing the clearance between tip portion 52 of mandrel 50 and the upper edge of surface 84 (FIG. 1) at the lower end of lower housing portion 14, axial motion is imparted to tip member 52 via means operable from above the extrusion head, such as via a piston in cylinder 70 interconnected through member 72 with shaft 66. This motion is imparted to tip portion 52 of mandrel 50 via collar 64 which is attached to shaft 66, pins 60 attached to collar 64, actuating member 56 attached to pins 60, and dowel pin 59 attached at each end to member 56 and passing through a bore in mandrel 50. Thus, the relationship of tip portion 52 with respect to surface 84 of ring member 85 (FIG. 1) in the lower portion of the housing is variable. The extent of movement of tip portion 52 is defined by the vertical spacing on either side of pin 59 (FIG. 1) and is identified therein as 86 plus 87. Such a variation in the size of outlet 80 accordingly will cause a corresponding variation in the wall thickness of the parison being formed in the outlet. Ring member 85 is releasably secured in lower housing portion 14 and serves to establish the size of the flow passage adjacent the outlet for a particular family of materials. For example, in changing from one type of thermoplastic to another having a substantially different melt viscosity, ring member 85 may be changed to increase or decrease the resistance to flow as desired.

The position of tip portion 52 in the outlet and consequently the size of the latter may be locally determined by means of a gage 86 suitable calibrated and connected (FIG. 3) to one of the axially movable train of connected parts.

The above description and particularly the drawings are set forth for purposes of illustration only and are not to be taken in a limited sense.

Though a mechanical connection has been illustrated and is preferred as the means for imparting movement to the mandrel in the spider type extrusion head of the present invention, it should be understood that alternative means which may be hydraulically or electrically actuated may be utilized. Typical of the alternative approaches for actuating mandrel 50 is the system disclosed and illustrated in copending application Ser. No. 639,686, filed May 19, 1967, and assigned to the assignee of the present invention.

Though any number of arms angularly oriented with respect to each other may be utilized to interconnect the ring member with the hollow cylindrical housing of the spider member, two are desired in order to keep the obstructions to the flow of material through the head at a minimum.

Various modifications and alterations will be readily suggested to persons skilled in the art. It is intended, therefore, that the foregoing be considered as exemplary only and that the scope of the invention be ascertained from the following claims.

I claim:

1. In an extrusion head for producing a thermoplastic parison of varying wall thicknesses, the combination comprising:
    (a) outer body means having a flow passage therein for said thermoplastic shaped initially in the form of a fully open vertically directed gooseneck portion;
    (b) a spider member disposed within said outer body means having a generally conically shaped nose portion concentrically positioned in the vicinity of the end of the verticaly directed leg of said gooseneck portion for dispersing said thermoplastic outwardly as it comes into contact therewith;
    (c) a mandrel mounted in said spider member having a tip portion which cooperates with the outer body means to define an annular orifice for forming said thermoplastic parison; and
    (d) means for axially moving said mandrel to vary the size of said orifice and consequently the thickness of the parison being formed therein, said means including an actuating sleeve slidably mounted on said spider member interconnected with said mandrel and actuating means for moving said sleeve positioned opposite said nozzle adjacent the outer body means.

2. The apparatus of claim 1 wherein said outer body means includes a split housing comprising an upper portion and a lower portion and means for releasably securing the inner body means between said upper and lower portions.

3. The apparatus of claim 1 wherein said spider member includes a hollow cylindrical portion extending downwardly from the base of said conically shaped nose portion, a ring member concentric with and spaced outwardly of said cylindrical portion, the space therebetween defining a section of flow passage for said plastic and a plurality of angularly spaced spider arms extending across said space, the ends of said arms being rigidly connected respectively to said cylindrical portion and said ring member.

4. In an extrusion head for producing a thermoplastic parison of varying wall thicknesses, the combination comprising:
    (a) a housing comprising an upper portion and lower portion releasably secured to the upper portion, said upper portion having a flow passage therein in the shape of a downwardly directed gooseneck;
    (b) a spider member disposed within and clamped between the upper and lower portions of said housing, said spider member having a conicaly shaped nose portion positioned in the lower end of said gooseneck shaped passage, a hollow cylindrical portion downwardly extending from the base of said conical portion, a ring member spaced outwardly from and concentric with said cylindrical portion having a pair of vertically oriented oppositely disposed slots formed therein, a plurality of arms spanning the space between and rigidly securing said cylindrical portion and ring member together, said space constituting an extension of said flow passage;
    (c) a mandrel slidably mounted within and extending beyond the lower end of the cylindrical portion of the spider member, said mandrel having a horizontally extending bore in the portion thereof within the cylindrical portion of the spider member, said mandrel having a tip portion cooperatively positioned in an opening in the lower portion of the housing to define with the wall of said opening an annular orifice for forming said thermoplastic parison therein;

(d) means for axially moving said mandrel comprising an actuating sleeve mounted for axial movement on the outer surface of said ring member, a dowel pin extending through the slots in said ring member and the bore in the mandrel and fastened at each end to said sleeve, a plurality of vertically extending bores in said upper portion of the housing, a positioning collar at the upper end of the upper portion of said housing, a rod in each of said bores interconnecting said collar and sleeve; and (e) means associated with said collar for imparting axial movement thereto.

5. The apparatus of claim 4 wherein said plurality of arms of said spider member are two in number.

6. In an extrusion head for producing a thermoplastic parison of varying wall thicknesses, the combination comprising:

(a) outer body means having a flow passage formed therein for said thermoplastic;

(b) a spider member disposed within said outer body means having a generally conically shaped nose portion concentrically positioned within said passage for dispersing said thermoplastic outwardly as it comes into contact therewith;

(c) a mandrel mounted in said spider member having a tip portion which cooperates with the outer body means to define an annular orifice for forming said thermoplastic parison; and (d) means operable in a direction parallel to said mandrel for axially moving said mandrel to vary the size of said orifice and consequently the thickness of the parison being formed therein, said axial moving means including an actuating sleeve mounted for axial movement on the outer surface of said spider member, a dowel pin fastening said sleeve and mandrel together, a plurality of vertically extending bores in said outer body means, a plurality of rods in said bores fastening said collar to said sleeve and means associated with said collar for imparting axial movement thereto.

References Cited
UNITED STATES PATENTS

| | | | |
|---|---|---|---|
| 3,327,350 | 6/1967 | Limbach | 18—14 V |
| 3,110,932 | 11/1963 | Fischer | 18—30 JT |
| 3,209,404 | 10/1965 | Hagen | 18—14 V |
| 2,632,202 | 3/1953 | Haines | 18—14 V |
| 2,940,126 | 6/1960 | Sheridan | 18—14 V UX |
| 3,217,360 | 11/1965 | Mason et al. | 18—5BV X |
| 3,314,107 | 4/1967 | Honstrater | 18—14 V X |
| 3,535,739 | 10/1970 | Mehnert | 18—14 V |

J. SPENCER OVERHOLSER, Primary Examiner

M. O. SUTTON, Assistant Examiner